Patented Mar. 10, 1931

1,796,058

UNITED STATES PATENT OFFICE

FRITZ STRAUB, OF BASEL, AND HERMANN SCHNEIDER, OF RIEHEN, NEAR BASEL, SWITZERLAND, ASSIGNORS TO SOCIETY OF CHEMICAL INDUSTRY IN BASLE, OF BASEL, SWITZERLAND

DYESTUFFS CONTAINING CHROMIUM AND PROCESS OF MAKING SAME

No Drawing. Application filed July 19, 1928, Serial No. 294,056, and in Switzerland August 13, 1927.

The present invention relates to the manufacture of dyestuffs containing chromium. It comprises the process of making these dyestuffs, the dyestuffs themselves, as well as the material that has been dyed with the new products.

This invention relates to the manufacture of new chromium compounds of azo-dyestuffs capable of being chromed by treating the azo-dyestuff with chromium-oxidehydrate in presence of water-soluble salts of hydrosulfuric acid, such as alkali metal sulfides, ammonium sulfide, and, if necessary, adding reducing agents, such as glucose, sugar, dextrin, soluble degradation products of starch, cellulose or the like. All these agents, as well as others containing hydroxyl-groups, such as glycerine, sulfite cellulose solution, ligninsulfonic acid or the like, can influence the process favorably in so far as they have, besides the necessary reducing action, a protective action against the destructive influence of alkalies on the dyestuffs or serve as protective colloids for avoiding a premature precipitation of chromium oxide. Additions of organic or inorganic salts may affect the chroming in the sense that the solubility or the color tint may be varied in a favorable direction. The alkali metal sulfides may also be used in combination with caustic alkalies or ammonia. This new process of chroming can be conducted in open or in closed apparatus.

The process is also new and interesting in that by the use of parent dyestuffs containing nitro-groups the simultaneous reduction of the nitro-groups leads to chromium compounds which, according to the proportion of the reducing agent used contain free amino-groups, azo-groups or azoxy-groups.

It could not be foreseen that the parent dyestuffs would be protected by the presence of the chromium compounds in such a manner that they will withstand the reducing action of the alkali metal sulfide and could be converted with very good yield into useful chromium compounds.

These new products constitute dark orange to brown-red and black-violet to grey-blue powders, dissolving in water and in dilute alkalies to the corresponding solutions, and dyeing animal and vegetable fibre orange, brown-red, black-violet and grey-blue tints. The constitution of these dyestuffs containing chromium is not known.

The chromium compounds are suitable for the production of fast tints on the fibre or for coloring varnishes.

The following examples illustrate the invention, the parts being by weight:—

Example 1

55 parts of crystallized sodium sulfide, 46 parts of chromium hydroxide paste containing 9.1 per cent of $Cr_2O_3$ and 10 parts of sulfite cellulose solution of 50 per cent strength are mixed together and stirred with 35 parts of the sodium salt of the dyestuff from 6-nitro-2-diazo-1-phenol-4-sulfonic acid and $\beta$-naphthol of the formula

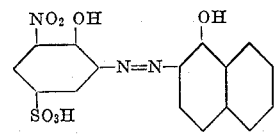

in the form of a paste of 63 per cent strength. The whole is then gradually heated to 80° C. whereby the dyestuff passes into solution; heating is continued for 12–15 hours at 90–100° C. The mass is neutralized by means of hydrochloric acid, heated to 80° C. re-dissolved by means of sodium carbonate and filtered and the filtrate is made neutral and salted out.

The dried violet-black powder thus obtained dissolves in water or concentrated sulfuric acid to a violet solution. It dyes wool in a sulfuric acid bath fast brownviolet.

Example 2

Into 100 parts of crystallized sodium sulfide, 184 parts of chromium hydroxide paste containing 9.1 per cent. of $Cr_2O_3$ and 140 parts of caustic soda solution of 30° Bé., are stirred gradually 140 parts of the dyestuff paste of Example 1. The whole is first warmed gradually to 80° C. until all the dyestuff has passed into solution and is then heated for another 15 hours at 90–100° C.

The mass is then filtered, the filtrate neutralized with acetic acid and salted out. The dry dyestuff is a blackish-violet powder, easily soluble in water to a reddish-violet solution. Concentrated sulfuric acid dissolves it to a blue-violet solution. In a sulfuric acid bath it dyes wool brown-violet tints of good fastness properties.

The dyestuff may be diazotized and coupled with, for example, β-naphthol, whereby the diazo-dyestuff is obtained which dyes silk in an acetic acid bath a fast black blue.

Example 3

36 parts of crystallized sodium sulfide, 46 parts of chromium hydroxide paste containing 9.1 per cent. of $Cr_2O_3$, 60 parts of the sodium salt of the dyestuff from 4-chloro-2-diazophenol and 1-meta-sulfamidophenyl-3-methyl-5-pyrazolone of the formula

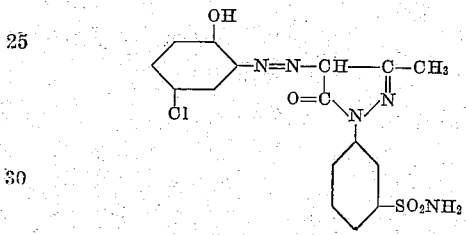

in the form of a paste of 25 per cent. strength and 30 parts of water are intimately mixed together and the mixture is heated in a closed apparatus for 6 hours at 115° to 120° C. After cooling, the mass is dissolved in about 1000 parts of hot water, filtered from small quantities of chromium mud and the product salted out.

The dry dyestuff is a brown-red powder which is soluble in water and dilute caustic soda solution to red-orange solutions. Concentrated sulfuric acid dissolves it to a yellow solution. In a sulfuric acid bath wool is dyed fast red-orange tints.

The chromium compounds obtained in similar manner with or without the addition of glycerine from diazotized 1-amino-2-naphthol-4-sulfonic acid and methylphenylpyrazolone or from the said diazo-compound and meta-nitrophenyl-3-methylpyrazolone dye wool fast red tints. While the chromium compound from a diazotized chloraminophenolsulfonic acid and phenylmethylpyrazolone dyes fast orange red.

Example 4

36 parts of crystallized sodium sulfide, 46 parts of chromium hydroxide paste containing 9.1 per cent. of $Cr_2O_3$, 20 parts of caustic soda solution of 30° Bé., 3 parts of sugar and 100 parts of water are dissolved with aid of heat and the whole is stirred with 15 parts of the dyestuff from 4-chloro-2-diazophenol and barbituric acid of the formula

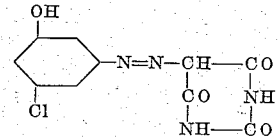

After heating for 8 hours at 80–90° C. the chroming is finished, whereupon the dyestuff is filtered and the solution neutralized with acetic acid and precipitated by means of common salt. The dry brown powder dissolves in water and dilute caustic soda solution to a yellow orange-red solution, in concentrated sulfuric acid to a pale yellow. Wool is dyed fast orange.

If the chroming is conducted in a closed apparatus for about 4 hours at 110–115° C. there is obtained a dyestuff which dyes brown-orange.

Example 5

16 parts of the sodium salt of the dyestuff from 4-nitro-2-diazophenol and β-naphthol of the formula

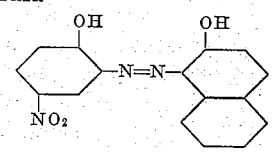

are stirred with a mixture of 20 parts of crystallized sodium sulfide, 37 parts of chromium hydroxide paste containing 11.2 per cent. of $Cr_2O_3$, 15 parts of caustic soda solution of 30° Bé. and 20 parts of water, and the whole is gradually heated to and is maintained at 90–100° C. for 16 hours. The dry dyestuff is a black powder soluble in hot water and dilute caustic soda solution to a blue-violet solution and in concentrated sulfuric acid to a violet solution.

If the dyestuff is treated with formaldehyde and bisulfite there is obtained a product which dyes silk and wool violettish-black tints of very good fastness properties.

Example 6

55 parts of crystalized sodium sulfide, 40 parts of chromium hydroxide paste containing 9.1 per cent. of $Cr_2O_3$ and 4 parts of sugar are mixed together and there are added at 40° C. 28 parts of the sodium salt of the dyestuff from diazotized and nitrated 1:2:4-aminonaphtholsulfonic acid and 1:4-naphtholsulfonic acid of the formula

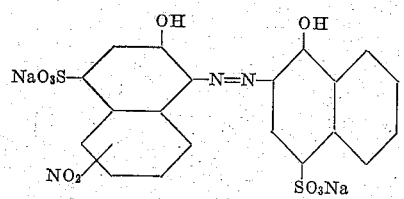

After dilution with 20 parts of water, the whole is gradually heated to 80° C. and after 3 hours to 90–100° C. until the chroming is complete. The dry dyestuff is a bluish-black powder, soluble in water, dilute caustic soda solution or concentrated sulfuric acid to a blue solution. It dyes wool or weighted or not weighted silk fast blue-grey tints.

*Example 7*

30 parts of the sodium salt of the dyestuff from diazotized 1:2:4-aminonaphtholsulfonic acid and 1:4:8-naphtholdisulfonic acid of the formula

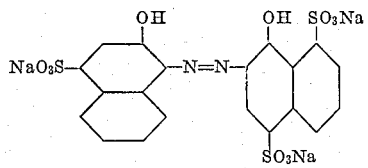

are stirred into a mixture of 36 parts of crystallized sodium sulfite, 46 parts of chromium hydroxide paste containing 9.1 per cent. of $Cr_2O_3$ and 10 parts of water, and after gradually warming the mixture is kept during 12 hours at 90–100° C. The dry dyestuff is a blue-black powder, which dissolves in water and dilute caustic soda solution to a blue solution. Wool is dyed fast blue-gray tints.

*Example 8*

36 parts of crystallized sodium sulfide, 46 parts of chromium hydroxide paste containing 9.1 per cent. of $Cr_2O_3$, 6 parts of caustic potash, 3 parts of glycerine and 20 parts of water are heated together until dissolution occurs, and 25 parts of the sodium salt of the dyestuff from diazotized 2:1-aminonaphthol-4:8-disulfonic acid and barbituric acid of the formula

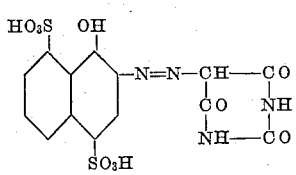

are added. The mixture is heated for 16–20 hours at 90–100° C. and the dyestuff is obtained by dilution with water, filtration, neutralization and salting out. The dry brownish black powder obtained dissolves in water and dilute caustic soda solution to a yellowish-rose solution. Wool is dyed fast bluish-red.

*Example 9*

30 parts of the dyestuff paste of the sodium salt of the dyestuff from 5-nitro-2-diazophenol and 2-aminophenyl-5-hydroxynaphthalene-7-sulfonic acid of the formula

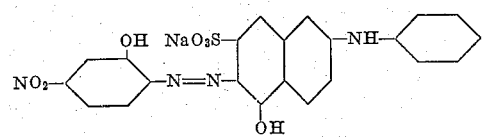

are introduced into a mixture of 36 parts of crystallized sodium sulfide, 46 parts of chromium hydroxide paste containing 9.1 per cent. of $Cr_2O_3$ and 3 parts of glycol. The whole is heated gradually to 90–100° C. and kept for 16 hours at this temperature. The mixture is diluted with water to 500 parts, filtered, the filtrate mixed with common salt and dilute acetic acid. The dyestuff precipitated is a blue-black powder which dissolves in water or concentrated sulfuric acid to a blue-violet solution. It dyes cotton blue-grey tints.

*Example 10*

150 parts of chromium hydroxide paste containing 11.6 per cent. of $Cr_2O_3$ and 120 parts of caustic potash are heated together until dissolution occurs, whereupon 36 parts of crystallized sodium sulfide are added and at 40° C. 155 parts of a press paste containing 58 per cent. of the sodium salt of the dyestuff from the nitrated diazo-compound of 1:2:4-aminonaphtholsulfonic acid and β-naphthol of the formula

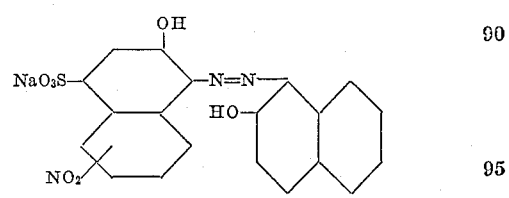

are introduced. Stirring is continued for 2 hours at 50–55° C. and then the temperature is raised to 80–85° C. After 12 hours the chroming is completed, whereupon the dyestuff is separated by dilution and neutralization. It is obtained in the form of a violet-black powder soluble in water, as well as in concentrated sulfuric acid, to a blue-black solution. In dilute caustic soda solution its color varies towards red-violet. It dyes wool and silk blue-grey tints of good fastness properties.

*Example 11*

100 parts of wool are thoroughly wetted in 2000 parts of water in the usual manner. 2 parts of the dyestuff of Example 3 are dissolved in 10–15 times its weight of boiling water and the solution is added to the dyebath, heated to 90° C. After introducing one-third of the necessary quantity of acid and 10 per cent. of Glauber's salt the goods are entered, the bath is brought to the boil and boiling is continued for 20 minutes to ½ hour. The second third portion of the acid is now added, boiling is continued for 20–30 minutes and the remainder of the acid is added and the boiling continued for ½ hour.

9 parts of sulfuric acid are required in all. After dyeing the goods are thoroughly washed.

*Example 12*

100 parts of silk are thoroughly wetted in 2000 parts of water in the usual manner. A dye-bath heated to 60° C. receives an addition of 4 per cent. acetic acid of 40 per cent. strength, 2 parts of the dyestuff made as described in Example 6 in 10–15 times its weight of hot water are added, the goods are entered and dyeing is continued for ¼ hour at 60° C. whereupon the temperature is raised to 80–85° C. and there are added further 2–4 per cent. of acetic acid of 40 per cent. strength and dyeing is continued for ½–¾ hour at the last-named temperature. The goods are then washed and dried.

Example 13

100 parts of well boiled out or well wetted cotton are dyed in a dye-bath containing 2500 parts of water, to which 2 parts of the dyestuff of Example 9 dissolved in 10–15 times its weight of water have been added. The goods are entered at 20–25° C. and the temperature is raised in the course of ½–¾ hour to the boil, 25–30 parts of Glauber's salt are added to the dye-bath, the goods are handled at this temperature for 10–15 minutes and then the bath is cooled to 85° C. and the goods are handled at this temperature for ½ hour. They are then washed and dried.

Example 14

2 parts of the dyestuff of Example 3 are dissolved in 100 parts of hot celluloid varnish, the solution is filtered, if necessary, and allowed to cool. There is obtained a red varnish.

What we claim is:—

1. A manufacture of azo-dyestuffs containing chromium by treating in the presence of a water-soluble salt of hydrosulfuric acid an azo-dyestuff, capable of being chromed, with chromium-hydroxide.

2. A manufacture of azo-dyestuffs containing chromium by treating in a closed vessel and in the presence of a water-soluble salt of hydrosulfuric acid an azo-dyestuff, capable of being chromed, with chromium-hydroxide.

3. A manufacture of azo-dyestuffs containing chromium by treating in a closed vessel and in the presence of a water-soluble salt of hydrosulfuric acid an azo-dyestuff, capable of being chromed, with chromium-hydroxide with addition of organic compounds containing hydroxyl-groups.

4. A manufacture of azo-dyestuffs containing chromium by treating in a closed vessel and in the presence of a water-soluble salt of hydrosulfuric acid an azo-dyestuff, capable of being chromed, with chromium-hydroxide with addition of organic compounds containing hydroxyl-groups and of salts of acids.

5. A manufacture of azo-dyestuffs containing chromium by treating in the presence of an alkali metal sulfide an azo-dyestuff capable of being chromed with chromium-hydroxide.

6. A manufacture of azo-dyestuffs containing chromium by treating in the presence of an alkali metal sulfide an azo-dyestuff capable of being chromed with chromium-hydroxide with addition of organic compounds containing hydroxyl-groups.

7. A manufacture of azo-dyestuffs containing chromium by treating in the presence of an alkali metal sulfide an azo-dyestuff capable of being chromed and containing at least one nitro-group, with chromium-hydroxide, and with addition of organic compounds containing hydroxyl-groups.

8. The manufacture of an azo-dyestuff containing chromium by treating in the presence of an alkali metal sulfide the dyestuff obtainable by coupling the diazotized 6-nitro-2-amino-1-phenol-4-sulfonic acid with β-naphthol, with chromium-hydroxide and with addition of sulfite cellulose waste liquor.

9. As new products the azo-dyestuffs containing chromium which are obtained by treating in the presence of a water-soluble salt of hydrosulfuric acid an azo-dyestuff capable of being chromed with chromium-hydroxide, which products form dark orange to brown-red, black-violet and grey-blue powders, dissolving in water and dilute alkalies with the corresponding coloration, and dyeing animal and vegetable fibres orange, brown-red, black-violet to grey-blue tints.

10. As new products the azo-dyestuffs containing chromium which are obtained by treating in the presence of an alkali-metal sulfide an azo-dyestuff capable of being chromed and containing at least one nitro-group, with chromium-hydroxide, and with addition of organic compounds containing hydroxyl-groups, which products form dark orange to brown-red, black-violet and grey-blue powders, dissolving in water and dilute alkalies with the corresponding coloration, and dyeing animal and vegetable fibres orange, brown-red, black-violet to grey-blue tints.

11. As new product the azo-dyestuff containing chromium which is obtained by treating in the presence of an alkali metal sulfide the dyestuff obtainable by coupling the diazotized 6-nitro-2-amino-1-phenol-4-sulfonic acid with β-naphthol, with chromium-hydroxide and with addition of sulfite cellulose waste liquor, which product forms a violet-black powder, dissolving in water or concentrated sulfuric acid to a violet solution, dyeing wool in a sulfuric acid bath a fast brown-violet tint.

12. The material which has been dyed with the dyestuffs of claim 9.

13. The material which has been dyed with the dyestuffs of claim 10.

14. The material which has been dyed with the dyestuffs of claim 11.

In witness whereof we have hereunto signed out names this 7th day of July, 1928.

FRITZ STRAUB.
HERMANN SCHNEIDER.